UNITED STATES PATENT OFFICE.

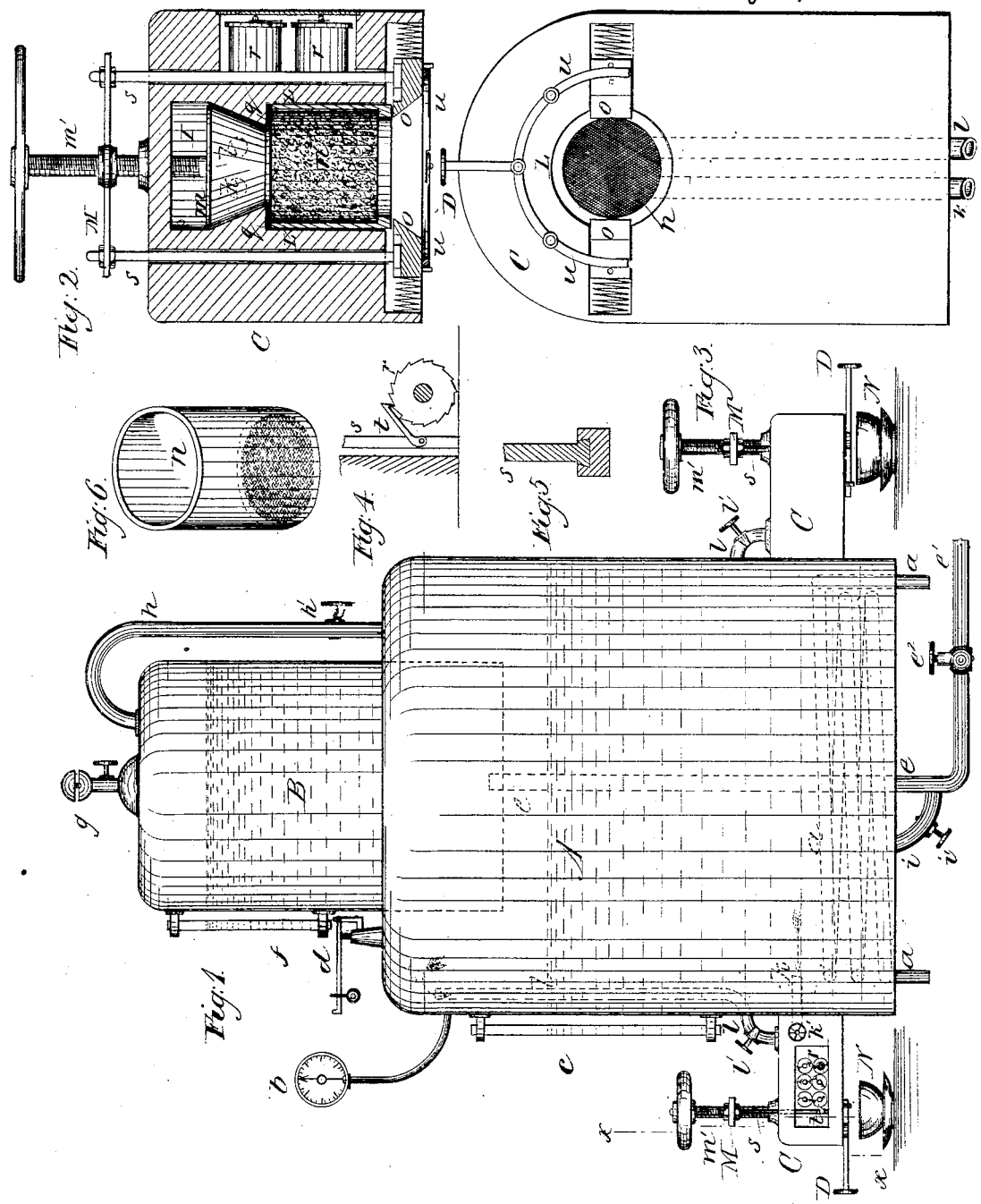

JOSEPH C. GRANT, OF NEW YORK, N. Y., ASSIGNOR TO HIMSELF, WILLIAM W. DUSENBERRY, OF BROOKLYN, NEW YORK, AND ANSEL E. PARKHURST, OF PLAINFIELD, NEW JERSEY.

METHOD OF AND APPARATUS FOR MAKING COFFEE AND OTHER BEVERAGES.

SPECIFICATION forming part of Letters Patent No. 276,579, dated May 1, 1883.

Application filed May 3, 1882. (No model.)

*To all whom it may concern:*

Be it known that I, JOSEPH C. GRANT, of the city, county, and State of New York, have invented a new and Improved Method of and Apparatus for Making Coffee and other Beverages, of which the following is a full, clear, and exact description.

The object of my invention is to insure a uniform quality in every cupful or other measured quantity of coffee or other beverage made, and to prevent dissipation of the strength and aroma of the beverage in making the same.

The invention consists in making infusions of coffee and other beverages in the act of drawing or delivering the same into the cup or other vessel in which the beverage is served, by passing steam and a definite quantity of hot water, or a definite quantity of hot water alone, through a fresh charge of the material for each cupful or other serving, measured to produce an infusion of a certain required strength.

The invention also consists in an apparatus for making coffee and other beverages in the manner stated.

In the accompanying drawings, Figure 1 represents a side elevation of my improved apparatus for making coffee and other beverages. Fig. 2 is a cross-section of a portion of the apparatus enlarged, the section being taken on line $x\,x$ of Fig. 1. Fig. 3 is a plan of a part of the apparatus inverted. Figs. 4 and 5 are detail views of parts of the apparatus. Fig. 6 is a perspective view of the removable receptacle for the coffee or other material used with the apparatus.

Referring to the drawings, A represents a hot-water vessel, from which the water for making the beverage is drawn. This vessel may be provided with a steam-coil, $a$, to heat the water; or, if preferred, gas-jets or other suitable means may be used for that purpose. The water-vessel may be provided with a steam-gage, $b$, a water-gage, $c$, and a safety-valve, $d$. B is an auxiliary water-vessel, in which the water is heated before being admitted to vessel A. Vessel B, as represented, is placed in connection with vessel A, so that a portion of its surface projects into the steam-space of A. It may be provided with a water-gage, $f$, and whistle $g$. A pipe, $e$, extends from vessel B through vessel A and connects with a water-supply pipe, $e'$, provided with a valve, $e^2$. The top of vessel B is connected by a pipe, $h$, provided with a valve, $h'$, with the steam-space of A. The water-space of A is connected with supply-pipe $e'$ by a pipe, $i$, provided with a valve, $i'$. This part of the apparatus relates to keeping a constant supply of hot water in A. At the start water may be admitted directly to vessel A from supply $e'$ through branch pipe $i$, (the valve of which is not at other times opened simultaneously with valve $e^2$,) and be heated directly by the coil. The cold water passes through pipe $e$ to vessel B and is partially heated by the hot water and steam in A. When B is nearly full valve $e^2$ is closed. The hot water and steam in A heat the water in B, and when the escaping steam sounds the whistle, or when the vessel A needs replenishing, the valves $h'\,i'$ are opened. The steam in A, passing up through pipe $h$ into B, presses on the top of the water therein and forces the same out of B through pipes $e\,i$ into A. When all the water is expelled from B valves $h'\,i'$ are closed, and valves $e^2$ being opened, a fresh supply of water passes into B. By this arrangement the lowering of the temperature of the water in A is avoided, as the water in B is kept nearly at the same temperature as that drawn from A, and when it passes into A it is quickly raised to the boiling-point.

C represents the faucet through and by which the beverage is drawn and delivered into the cup or other vessel in which the beverage is served. The faucet is also adapted to receive the material from which the beverage is made. It is attached to or connected with the outside of vessel A, and is provided with a valve-chamber, I, from which pipes $k\,l$, provided respectively with valves $k'\,l'$, extend into vessel A, pipe $k$ terminating below the water-line and pipe $l$ above the water-line in the steam-space. By means of pipes $k\,l$ steam and water may be simultaneously drawn from vessel A and separately conducted to the receptacle for the ground coffee or other material; or by closing one of the valves $k'\,l'$ steam or water only may be drawn. The valve $m$ in chamber I is attached to a screw-stem, $m'$, by which it is raised and lowered. A chamber, L, which communicates with the valve-chamber, serves as the mouth of the faucet and as a receptacle for the ground coffee or other material, or as a case for the cup or tube $n$, in which the material is preferably placed. The cup or tube $n$, which is adapted to form a tight connection with the mouth of the faucet, has a perforated or strainer bottom, and when placed in the chamber L it is held by spring-latches $o$, placed in guide-slots in the under side of the faucet, which project under the edge of the cup or tube when thrown forward by their springs. A packing-gasket, $q$, may be placed in the upper part of chamber L to prevent leakage.

To latches $o$ $o$ are connected by sliding dovetailed joints, rods $s$ $s$, which pass up through the faucet and join a yoke, M, through which the valve-stem $m'$ is screwed, so that when the valve is raised and lowered the yoke, rods $s$ $s$, and latches move with it. One of the rods $s$ carries a pawl, $t$, which engages a ratchet on one of a train of registers, $r$, placed in a cavity in the faucet. The registering attachment is for the purpose of registering each cup or tube $n$ containing the material from which a cupful of coffee or other beverage is to be made. When a cup or tube, $n$, is placed in the chamber L and the valve $m$ is raised the upward movement of the rods draws the latches against the tube $n$, which is pressed tightly against the gasket $q$, the pawl is moved forward one tooth, and when the valve is screwed down the pawl, engaging the ratchet, moves the registering devices and registers the cup or tube $n$ last inserted.

The process of making coffee will now be described.

The water in A having been heated to the proper degree, if, say, a cup, N, of coffee is required of a certain strength, a cup or tube, $n$, charged with sufficient ground coffee to produce a quantity of liquid coffee of the desired strength sufficient to supply cup N, is placed in the faucet. The valve is now opened, the steam passes to the coffee, heating and moistening it, whereby the giving off of the aromatic substance is greatly facilitated, and the hot water entering at about the same instant takes up the essential properties of the coffee and flows as liquid coffee from the faucet into the cup N, which serves as a measure to indicate when sufficient water has passed through the ground coffee to produce the beverage of the desired quantity and strength, and when this is indicated by the filling of the cup the valve $m$ is closed. The tube $n$, with its exhausted charge of coffee, is now removed and another with a fresh charge of coffee is placed in the faucet to make another cupful of beverage. The same process is employed to make tea and other beverages produced by infusing the beverage-yielding material, and also for chocolate and similar substances. The quantity of coffee or other material placed in the tube or cup $n$ is intended to bear a definite relation to the capacity of the cup N, or other vessel into which the beverage is drawn, and this relation must be determined by the degree of strength the beverage should have to suit individual tastes. The tubes or cups may be but partially filled with the ground coffee; or several faucets may be attached to the vessel A, each having a separate connection with the hot-water vessel, and adapted to supply servings or drawings of different quantities, but of uniform quality. For example, one faucet may be adapted to receive tubes $n$ holding a half-ounce of ground coffee capable of producing sufficient beverage of a desired strength to fill a cup, N, holding eight fluid ounces. Another faucet may receive tubes $n$ holding an ounce, and capable of supplying a sixteen-ounce cup, the beverage having the same quality in both cases.

The process, it will be understood from the foregoing, consists in making coffee instantaneously in the act of drawing or delivering the same into the cup or other vessel in which it is served. The object is to make the beverage freshly for each drawing, or serving from a fresh charge of the material and at the moment of serving it, whereby the necessity of accumulating a quantity of the beverage before commencing to serve it is avoided, and there is no opportunity of its losing its fragrance and strength and acquiring the disagreeable odor and taste which coffee particularly is apt to acquire if permitted to stand some time before using. When coffee is made in quantities by direct and prolonged contact of the water with the ground coffee it is liable to be injured by the water extracting the bitter astringent properties of the coffee. In my process the water is passed rapidly through the material, being forced through the same by the pressure of steam in A, and it extracts only the fragrant aromatic substances and makes coffee of a very delicate flavor, strong, but without bitterness. Another important advantage is that the servings of coffee are of a uniform quality. If a certain grade of coffee is used, and the cups are of uniform size, the servings will be uniformly the same in quality. Again, as no coffee is necessarily accumulated or made except as needed and at the moment, depreciation of the beverage by delay in serving is avoided. If a weaker cup of coffee is wanted than that for which the faucet or faucets are adjusted, it can be had by simply decreasing the amount of material placed in the cups or tubes $n$. Hence there is no necessity for having a separate supply of hot water at hand.

The steam in vessel A should be kept at sufficient pressure to rapidly drive the water through the faucet and the coffee or other material placed in the faucet.

The latches $o$ $o$ are opened to admit the cup or tube $n$ by means of pivoted levers $u$ $u$, connected with pins on the latches and operated by pusher D.

It must be understood that the cups or vessels N may be adapted to indicate the quantity of liquid to be drawn through the faucet to produce the proper strength of coffee, instead of their capacity being limited to or regulated by the cups or tubes $n$.

I claim—

1. The method of making coffee and other beverages in the act of drawing or delivering the same into the cup or other vessel in which the beverage is served, and for each serving separately, which consists in introducing into a suitable receptacle in a faucet a charge of ground coffee or similar material sufficient to infuse one cup or one drawing of the beverage to the strength desired, and then passing through said charge enough hot water to supply said cup or drawing, substantially as herein set forth.

2. The method of making coffee and other beverages for each serving separately from a fresh charge of material, and at the moment of service, which consists in taking a quantity of the material measured to yield an infusion of a desired strength, passing a definite quantity of hot water through the said material, and delivering the infusion into a cup or other vessel adapted to receive the quantity of the beverage having the strength which the material is measured to yield, substantially as herein set forth.

3. The method of making coffee and other beverages, which consists in placing in a suitable receptacle connected with a faucet a charge of ground coffee or similar material sufficient to infuse one cup or one drawing of beverage to the strength desired, and then passing through the said charge steam and sufficient hot water to supply said cup or said drawing of beverage, substantially as herein set forth.

4. In an apparatus for making coffee and other beverages, the combination of a hot-water vessel, A, and detached cup or vessel N, with an intermediate receptacle for the ground coffee or other material, provided with a valve, and connected with the water-vessel, substantially as and for the purpose specified.

5. In an apparatus for making coffee and other beverages, the combination of a hot-water receptacle, a faucet provided with a receptacle for holding a charge of ground coffee or similar material below the faucet-valve, and a pipe, $k$, provided with a valve, $k'$, leading from the valve-chamber of the faucet to the water-space of the water-receptacle, substantially as herein described.

6. The combination of a hot-water vessel, a faucet provided with a receptacle for holding a charge of coffee or similar material below the faucet-valve, and pipes connecting the valve-chamber of the faucet with the hot-water and steam spaces of the water-vessel, substantially as described.

7. The faucet C, connected with a water-vessel, and provided with a suitable valve, in combination with a removable cup or tube, $n$, said faucet and cup or tube having no connection with a cup or other vessel for receiving the coffee or other liquid drawn through the faucet, substantially as herein shown and described.

8. The faucet C, connected with a water-vessel, and provided with a suitable valve, in combination with a detachable cup or tube for the coffee or other material, and the vessel N for receiving the beverage, placed under the mouth of the faucet, but having no connection therewith, for the purpose specified.

9. The faucet C, provided with a suitable recess or chamber to receive the cup or tube for the coffee or other material, and with latches $o$ $o$, in combination with the cup or tube $n$, substantially as described.

10. The combination of a hot-water vessel, the faucet C, provided with a suitable valve, pipe or pipes connecting the valve-chamber in the faucet with the hot-water vessel, a detachable receptacle for the ground coffee or other material, placed below the faucet-valve, and a serving cup or vessel, N, placed under the mouth of the faucet, but having no connection therewith, as and for the purpose specified.

11. The combination of hot-water vessels A B, constructed as described, with pipe $e$, connected with a water-supply pipe, and pipes $h$ $i$, provided with suitable valves, substantially as described.

12. The combination of the pusher D and levers $u$ $u$ with the latches $o$ $o$, for the purpose specified.

13. In combination with the cup or tube $n$ and the faucet C, a registering device connected with the faucet-valve, so that every cup or tube placed in the faucet is recorded by the registering apparatus, substantially as described.

14. In combination with the detachable cup or tube $n$, valve $m$, and rod $s$, provided with a pawl, $t$, the registering device $r$, arranged to register the number of cups or tubes placed in the faucet, substantially as specified.

JOSEPH C. GRANT.

Witnesses:
GEO. D. WALKER,
J. H. SCARBOROUGH.